(12) United States Patent  (10) Patent No.: US 6,298,792 B1
Jackson, Jr.  (45) Date of Patent: Oct. 9, 2001

(54) HI-RAIL WHEEL ASSEMBLY FOR IMPROVED TRACTION

(75) Inventor: Robert D. Jackson, Jr., Pittsburgh, PA (US)

(73) Assignee: ESSCO, Pittsburgh, PA (US)

( * ) Notice: Subject to any disclaimer, the term of this patent is extended or adjusted under 35 U.S.C. 154(b) by 0 days.

(21) Appl. No.: 09/513,226

(22) Filed: Feb. 24, 2000

(51) Int. Cl.$^7$ ...................................................... B61F 11/00
(52) U.S. Cl. .................... 105/215.1; 105/26.1; 105/72.2; 105/215.2
(58) Field of Search ................................ 105/26.1, 72.2, 105/215.2, 215.1

(56) References Cited

U.S. PATENT DOCUMENTS

| | | | |
|---|---|---|---|
| 3,797,401 | * | 3/1974 | Alimanestianu ....................... 104/130 |
| 4,381,713 | * | 5/1983 | Cripe ..................................... 105/215 |
| 4,488,494 | | 12/1984 | Powell, Sr. . |
| 4,527,486 | * | 7/1985 | Baird et al. ......................... 105/215 C |
| 4,534,297 | * | 8/1985 | Johnson .............................. 105/215 C |
| 4,583,465 | * | 4/1986 | Powell .............................. 105/215 C |
| 5,018,453 | * | 5/1991 | Kinard ................................. 105/72.2 |
| 5,154,124 | * | 10/1992 | Madison ............................... 105/72.2 |
| 5,403,031 | * | 4/1995 | Gottschalk et al. .................. 280/704 |

FOREIGN PATENT DOCUMENTS

640447 * 5/1962 (CA) ....................................... 105/97

* cited by examiner

Primary Examiner—S. Joseph Morano
Assistant Examiner—Frantz F. Jules
(74) Attorney, Agent, or Firm—Robert J. Veal; Christopher A. Holland; Burr & Forman LLP (57) ABSTRACT

An improved hi-rail wheel assembly includes a frame connected to an axle tube surrounding an axle, a pair of railway wheels mounted in spaced relation on the axle tube, a first pair of pivotal links connected between a frame and the axle, and a second pair of pivotal links connected to the frame and the axle. The hi-rail wheel assembly is attached to a conventional roadway vehicle such that the extension of said pivotal links effects a downward lowering of the axle and the railway wheels from the frame and lifts the vehicle whereby the vehicle tires engage the railroad track, and the retraction of the pivotal links effects an upward lifting of the axle and railway wheels towards the frame such that the vehicle tires engage a ground surface or roadway. Each pivotal link includes a cam aperture and a recessed cam shoulder surrounding the cam aperture to receive a cam. A cam having an eccentric aperture is used to engage the cam aperture and the recessed shoulder such that the eccentric aperture is connected to the axle. The position of the eccentric aperture with respect to the recessed cam shoulder will thereby determine the distance between the axle and the frame when the hi-rail wheel assembly is in the extended position, and consequently will affect the traction between the vehicle tires and the railroad tracks.

14 Claims, 6 Drawing Sheets

HI-RAIL WHEEL ASSEMBLY FOR IMPROVED TRACTION

FIELD OF THE INVENTION

The present invention relates to hi-rail assemblies that allow conventional roadway vehicles to be driven on a railroad track, and, more particularly, to a hi-rail assembly having a height adjustment means and that is attachable to a conventional vehicle to allow continued traction between the vehicle tires and the rails of the railroad track after wear of the vehicle tires.

BACKGROUND OF THE INVENTION

Hi-rail capability refers to railway wheels, usually retractable, that are attached to standard roadway vehicles for the purpose of allowing the vehicles to travel on conventional railroad tracks in addition to conventional roadways. Hi-rail vehicles are commonly used as maintenance vehicles or as track inspection cars due to their mobility on both standard highways and railroad tracks.

A conventional hi-rail vehicle is described in U.S. Pat. No. 4,583,465 issued to Power, Sr. This design illustrates a railway wheel apparatus that allows simultaneous actuation of two cylinders to lower the railway wheel apparatus onto the railroad track. In operation, the railway wheels contact the rails and raise at least a portion of the vehicle off of the railroad track. Generally, the rear pair of vehicle wheels remain in contact with the railroad track to be able to propel the vehicle on the railroad tracks. A problem with this design is that the vehicle tires remain in constant contact with the railroad track, and subsequently will lose traction due to wear of the tire. Because the railway wheel apparatus remains at a constant position with respect to the railroad track, the wear of the vehicle tires will cause the traction between the vehicle tires and the railroad track to decrease. Consequently, in order to regain the traction lost due to wear of the vehicle tires, either the hi-rail wheel assembly must be adjusted through technical and complex mechanical adjustments of the wheels that reposition the vehicle at a lower level, which can be very complicated and require great effort, or the worn vehicle wheels will have to be replaced on the vehicle by new wheels that have not experienced the deterioration of the use, thereby discarding the worn wheels before the end of the standard life of the wheels.

What is needed, then, and not found in the prior art, is a hi-rail assembly that provides a means for making adjustments to reduce the distance between the hi-rail assembly and railroad tracks so that the vehicle tires will continue to make a satisfactory connection with the railroad tracks.

SUMMARY OF THE INVENTION

A further object of the present invention is to provide an improved hi-rail assembly having a height that can be altered to vary the position between the vehicle tire and the railroad track.

These and other objects of the invention are accomplished through the improved hi-rail assembly of the present invention. The hi-rail assembly of the present invention includes a frame that is attachable to a conventional road vehicle, an axle tube attached to the frame via a pair of is pivotal links at the two ends of the axle tube, and a pair of railway wheels attached to the ends of the axle tube that are used to engage the railroad track. The axle tube is connected to the pivotal links via a block and a block pin, such that the pivotal links will determine the distance between the frame and the axle tube when the railway wheels are in their extended position.

Each pivotal link of the present invention includes an upper link plate and a lower link plate. The upper link plate is pivotally connected to the lower link plate such that when pressure is applied to the pivotal link, both the lower link plate and the upper link plate will pivot, according to the direction of the pressure applied, to either an extended position to engage the railroad tracks or to a contracted position to allow the vehicle to travel on a standard roadway. The lower link plate includes a cam aperture and a recessed cam shoulder for receiving the block pin attached to the block. Furthermore, the assembly includes a locking means to secure the position of each pivotal link in either an extended or a retracted position.

To allow the distance between the frame and the ground surface to be adjusted to allow a worn tire to make contact with the railroad track, the lower link plate includes a recessed cam shoulder surrounding the cam aperture. The recessed cam shoulder is sized to receive a cam, and includes a number of mounting bores surrounding the outer periphery of the cam. The cam includes several attachment apertures surrounding the outer periphery of the cam, and is designed to engage the lower link plate in the space defined by the outer periphery of the bored shoulder. The cam includes an eccentric aperture located near the center of the cam aperture. The eccentric aperture will engage the block pin, and, when the cam is rotated within the lower link plate, the distance of the axle tube above the ground surface will be varied according to the placement of the eccentric aperture of the cam within the lower link plate. Thus, the distance between the frame and the axle tube will be changed, and the traction between the railroad tracks and the vehicle tires will therefore be controllable by the rotation of the cam.

Further aspects of the present invention will become apparent during the course of the following description and by reference to the attached drawings.

BRIEF DESCRIPTION OF THE DRAWINGS

A hi-rail railway car assembly is depicted in the accompanying drawings which form a portion of this disclosure and wherein.

DESCRIPTION OF THE PREFERRED EMBODIMENTS

Figure 1:
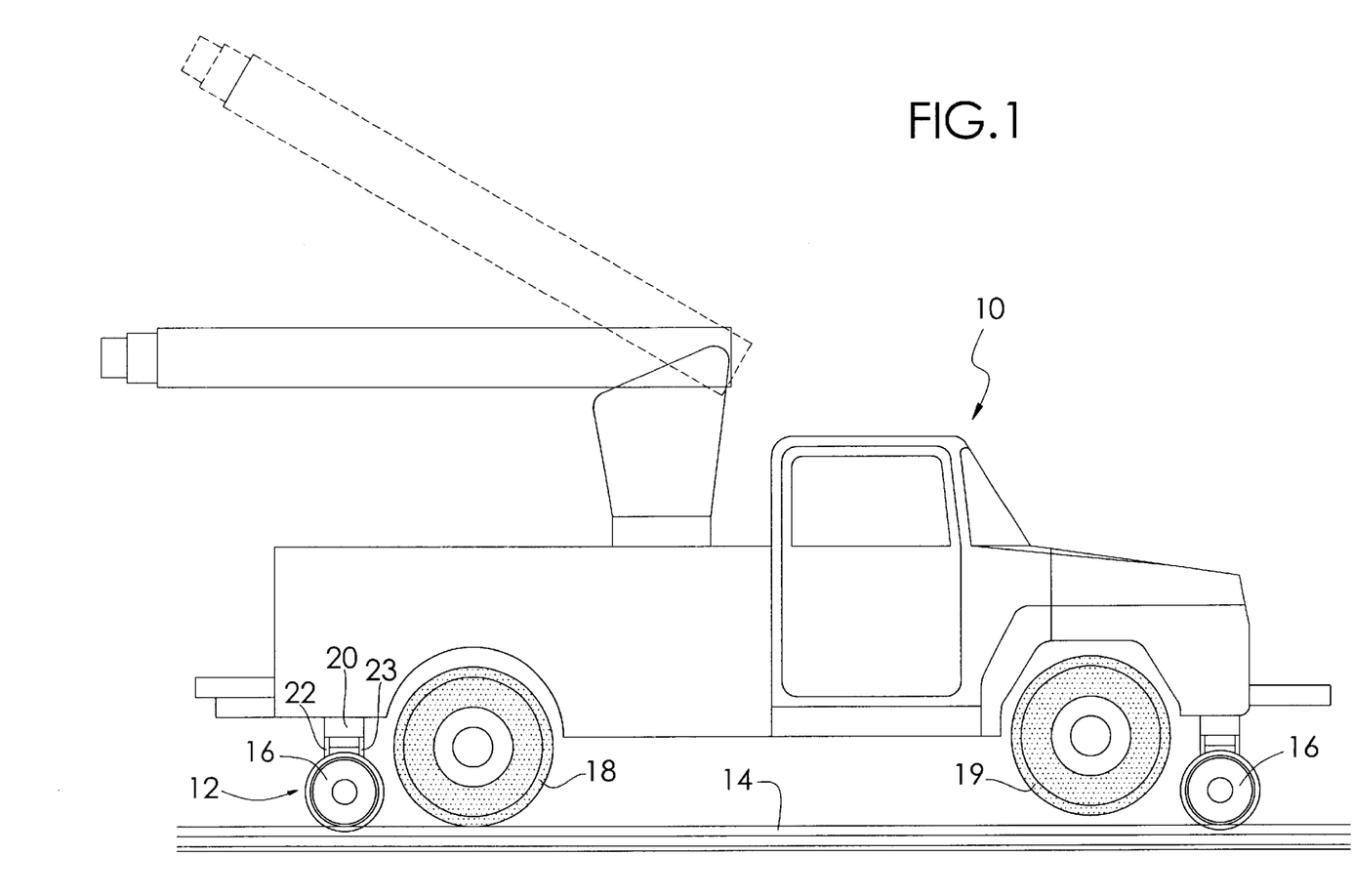
FIG. 1 is a side elevational view of the hi-rail wheel assembly of the present invention mounted to a conventional road vehicle.
Figure 2:
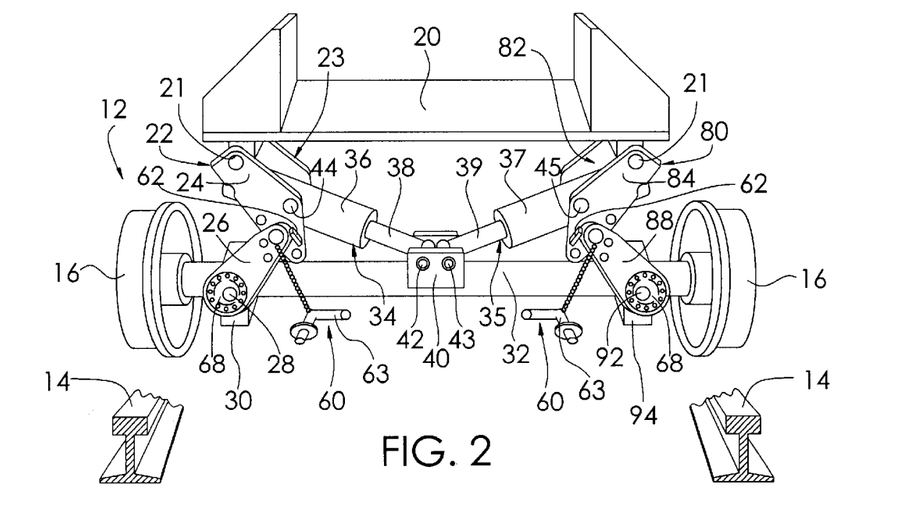
FIG. 2 is a rear elevational view of the hi-rail wheel assembly in a retracted position.
Figure 3:
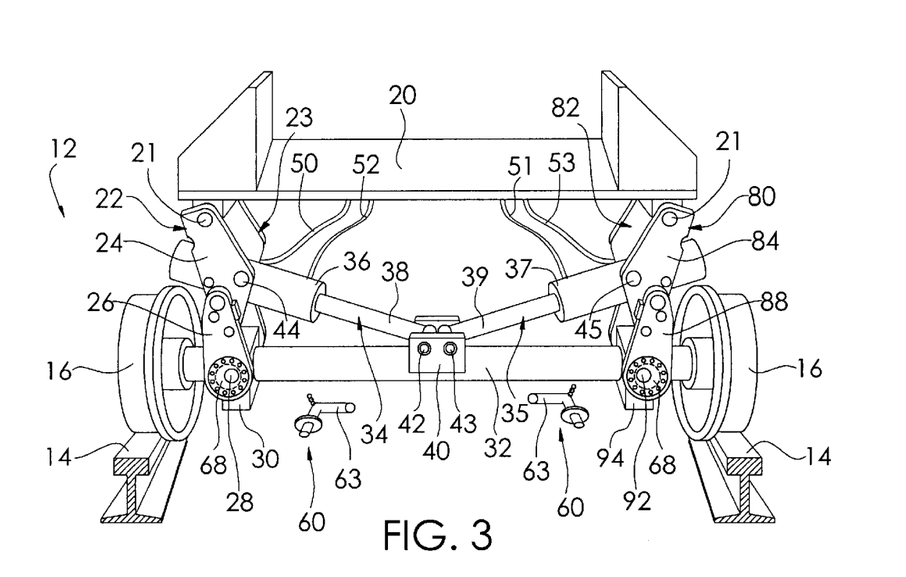
FIG. 3 is a rear elevational view of the hi-rail wheel assembly in an extended position.

Looking at FIG. 1, a conventional road vehicle 10 having a pair of rear tires 18 and a pair of front tires 19 is illustrated utilizing an attached hi-rail wheel assembly 12 of the present invention. The purpose of the hi-rail wheel assembly 12 is to allow the vehicle 10 to be able to travel on railroad tracks 14 as well as on conventional roadways. This is accomplished by attaching the hi-rail wheel assembly 12 to the base of the vehicle 10. The hi-rail wheel assembly 12 can be moved into one of two positions: retracted (as illustrated in FIG. 2) or extended (as illustrated in FIG. 3). While driving on a roadway, the hi-rail wheel assembly 12 will be in the retracted position close to the base of the vehicle 10 such that the vehicle tires 18, 19 will make contact with the roadway. To change from roadway travel to travel on railroad tracks 14, the hi-rail wheel assembly 12 is extended downward from the vehicle 10 so that the railway wheels 16 will make contact with the railroad tracks 14 (see FIG. 3). Conventionally, when a -rail wheel assembly 12 is operated on the railroad tracks 14, the front set of vehicle tires 19 will be elevated from the railroad tracks 14 while the rear set of vehicle tires 18 will make contact with the railroad tracks 14 so as to propel the vehicle 10 along the railroad tracks 14. The object of this invention, therefore, is to control the elevation of the rear vehicle tires 18 making contact with the railroad tracks 14. As a result, in a conventional hi-rail assembly where the front vehicle tires 19 are elevated above the railroad track 14, the present invention would solely be used with the rear vehicle tires 18, although the invention could be used interchangeably with front vehicle tires 19 as well as rear vehicle tires 18 as desired by the user.

Figure 5:
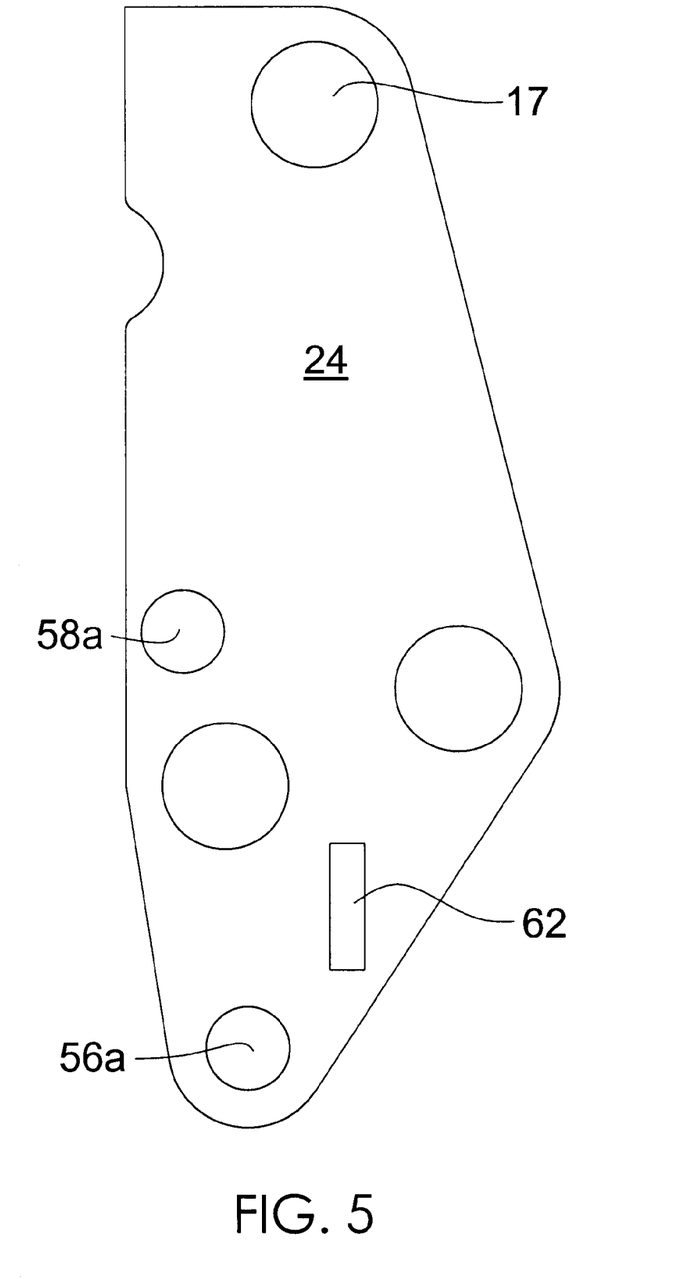
FIG. 5 is a side elevational view of an upper link plate of the hi-rail wheel assembly.

FIGS. 2 and 3 illustrate the hi-rail wheel assembly 12 connected having a frame 20 that is attachable to the vehicle 10 (not illustrated in FIG. 2 or 3). Connected to each end of the frame 20 is a pair of coincidentally spaced pivotal links, the first pair labeled 22, 23 and the second pair labeled 80, 82. Each pair of pivotal links 22, 23 and 80, 82 includes frame pin apertures 17 (seen in FIG. 5) that are designed to engage a frame pin 21 that joins each pair of pivotal links 22, 23 and 80, 82 with the frame 20. Both pairs of pivotal links 22, 23 and 80, 82 are additionally connected to an axle tube 32, and are aligned and operate in a plane parallel to the axle tube 32. Since both pairs of pivotal links 22, 23 and 80, 82 operate in a plane parallel to the axle tube 32, none of the pivotal links 22, 23, 80, or 82 protrude outwardly to any significant extent beyond the frame 20 of the vehicle 10 and parts associated therewith.

Figure 4:
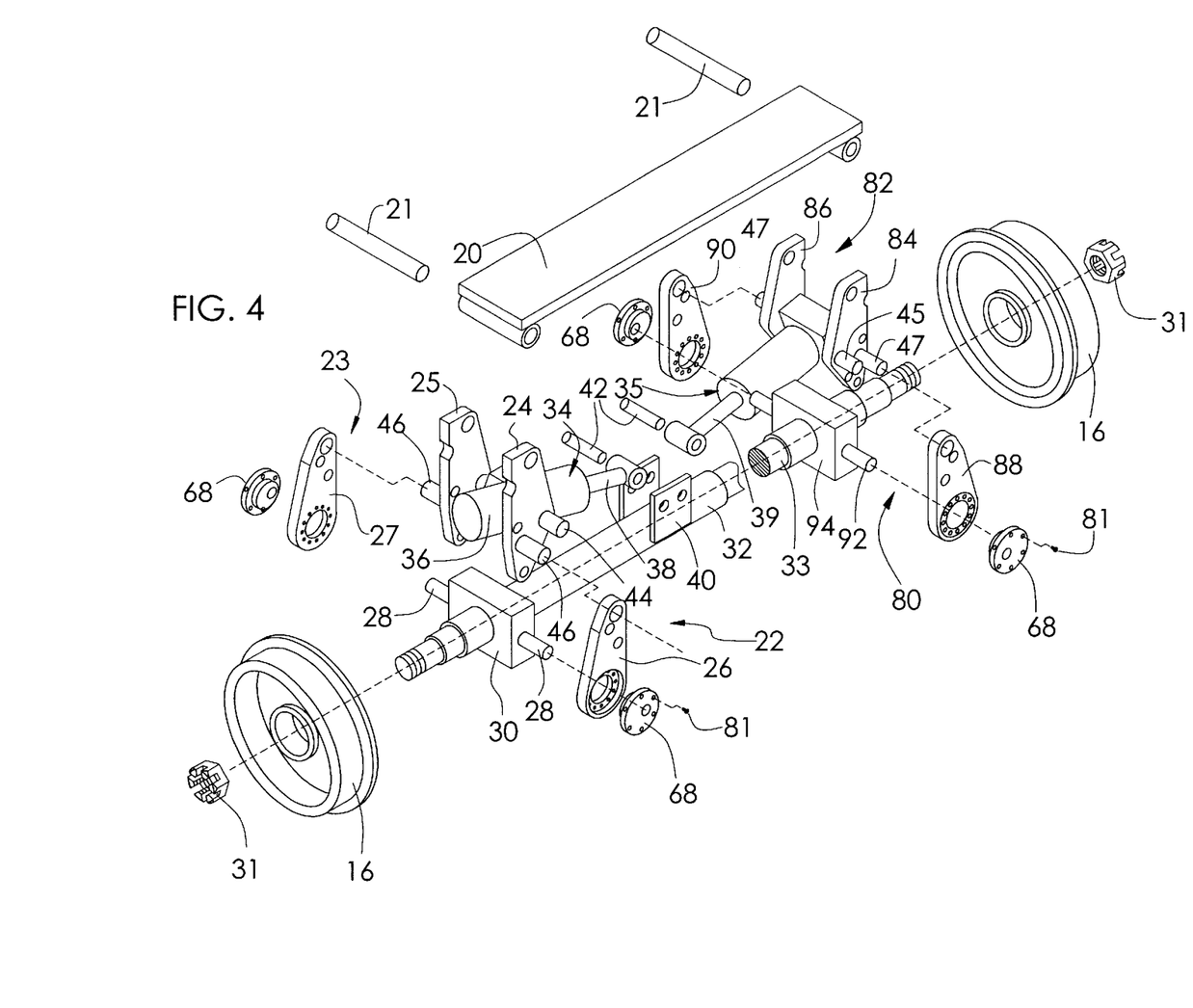
FIG. 4 is an exploded view of the hi-rail wheel assembly of the present invention.

FIG. 4 shows an exploded view of the hi-rail wheel assembly 12 of the present invention.

The first set of pivotal links includes first pivotal link 22 having an upper link plate 24 and a lower link plate 26, and second pivotal link 23 having an upper link plate 25 and a lower link plate 27. Each lower link plate 26, 27 is connected via a block pin 28 to a block 30 that is attached to the axle tube 32 and serves as a means for holding the axle tube 32. Similarly, the second set of pivotal links includes first pivotal link 80 having an upper link plate 84 and a lower link plate 88, and second pivotal link 82 having an upper link plate 86 and a lower link plate 90. Each lower link plate 88, 90 is connected via a second block pin 92 to a second block 94 that is welded to the axle tube 32 at the end opposite of the first block 30.

Inside of the axle tube 32 is an axle 33 (illustrated in FIG. 4), and a railway wheel 16 is attached at each end of the axle 33 such that the axle 33 will freely rotate within the axle tube 32 to control the rotation of the railway wheels 16. The railway wheels 16 engage the ends of the axle 33; and each railway wheel 16 is secured to the axle 33 via a railway wheel nut 31.

A pair of hydraulic cylinder assemblies 34, 35 are provided to actuate the pivotal links 22, 23 and 80, 82 to swivel.

The first hydraulic cylinder assembly 34 includes a hydraulic cylinder 36, a piston rod 38, and a piston (not illustrated) positioned inside of the hydraulic cylinder 36 and attached to a first end of the piston rod 38. A second end of the piston rod 38 is connected to a pair of mounting plates 40 using a mounting pin 42. The mounting plates 40 are attached to the axle tube 32 at approximately the middle point of the axle tube 32. The hydraulic cylinder 36 is pivotally attached between the upper link plates 24, 25 by a cylinder pin 44. Further, the upper link plates 24, 25 are connected to the lower link plates 26, 27 via a plate connecting pivot 46. The outward movement of the piston rod 38 relative to the hydraulic cylinder 36 will rotate the upper link plate 24 in a clockwise direction about the plate connecting pivot 46, while the lower link plates 26, 27 will rotate in a counterclockwise direction about the plate connecting pivot 46. Ultimately, the outward extension of the piston rod 38 will cause these pivotal links 22, 23 to occupy the extended position as illustrated in FIG. 3.

The second hydraulic cylinder assembly 35 works as the first, and includes a hydraulic cylinder 37, a piston rod 39, and a piston (not illustrated) positioned inside of the hydraulic cylinder 37 and attached to a first end of the piston rod 39. A second end of the piston rod 39 is also connected to the mounting plates 40 using a mounting pin 43. The hydraulic cylinder 37 is pivotally attached between the upper link plates 84, 86 by a cylinder pin 45. Further, the upper link plates 84, 86 are connected to the lower link plates 88, 90 via a plate connecting pivot 47. The outward movement of the piston rod 39 relative to the hydraulic cylinder 37 will rotate the upper link plates 84, 86 in a counterclockwise direction about plate connecting pivot 47, while the lower link plates 88, 90 will rotate in a clockwise direction about the plate connecting pivot 47. Ultimately, the outward extension of the piston rod 39 will cause these pivotal links 80, 82 to occupy the extended position as illustrated in FIG. 3.

Referring to FIG. 3, the first hydraulic cylinder assembly 34 is controlled from a source of fluid pressure not illustrated through a pair of flexible conduits 50, 52 connected to opposite ends of the hydraulic cylinder 36. Flow of the fluid through the conduits 50, 52 is controlled by conventional valve means (not illustrated). As a result, in order to drive the piston rod 38 outwardly from the hydraulic cylinder 36, fluid pressure is supplied through the first conduit 50 to the hydraulic cylinder 36 and fluid is discharged from hydraulic cylinder 36 through conduit 52 in a standard manner. If the hi-rail wheel assembly 12 needs to be in the retracted position (as in FIG. 2), fluid is supplied to the hydraulic cylinder 36 through conduit 52 and is discharged from the hydraulic cylinder 36 through conduit 50.

Similarly, the second hydraulic cylinder assembly 35 is controlled from a source of fluid pressure not illustrated through a pair of flexible conduits 51, 53 connected to opposite ends of the hydraulic cylinder 37. Flow of the fluid through the conduits 51, 53 is controlled by conventional valve means (not illustrated). As a result, in order to drive the piston rod 39 outwardly from the hydraulic cylinder 37, fluid pressure is supplied through the first conduit 51 to the hydraulic cylinder 37 and fluid is discharged from hydraulic cylinder 37 through conduit 53 in a standard manner. If the hi-rail wheel assembly 12 needs to be in the retracted position (as in FIG. 2), fluid is supplied to the hydraulic cylinder 37 through conduit 53 and is discharged from the hydraulic cylinder 37 through conduit 51.

In order to mechanically secure the pivotal links 22, 23, 80, and 82 in their extended position as illustrated in FIG. 3, a means for locking the upper link plates 24, 25, 84, and 86 and the lower link plates 26, 27, 88, and 90 is provided. The locking means includes a first extended locking aperture 56a formed in the upper link plates 24, 25, 84, and 86 (see FIG. 5) which, when disposed in the extended position, will correspond with a second extended locking aperture 56b formed in the lower link plates 26, 27, 88, and 90 (see FIG. 6A). A locking element 60 (see FIGS. 2 and 3) may then be inserted into these coinciding first and second locking apertures 56a, 56b to secure the elements of the pivotal links 22, 23, 80, and 82 against relative movement while extended.

To prevent undesired dislodgment of the locking element 60 from the locking apertures 56a, 56b, a locking shoulder 62 is secured to the upper link plates 24, 25, 84, and 86 so that the locking element 60 may engage the locking shoulder 62. After the locking element 60 is inserted into the locking apertures 56a, 56b, an extension 63 of the locking element 60 may be swung underneath the locking shoulder 62 so as to prevent the outward dislodgment of the locking element 60.

When the assembly 12 is operated to its retracted position, the locking means includes a first retracted locking aperture 58a formed in upper link plates 24, 25, 84, and 86 that will align with a second retracted locking aperture 58b formed in the lower link plates 26, 27, 88, and 90. Subsequently, the locking element 60 may be inserted through the aligned first and second retracted locking apertures 58a, 58b to secure the lower link plates 26, 27, 88, and 90 in position with the upper link plates 24, 25, 84, and 86.

As stated above, the hi-rail wheel assembly 12 may be in either a retracted position or an extended position. A problem commonly occurring with conventional railway wheel assemblies is that after a period of constant use in the extended position, the friction between the vehicle tires 18 and the railroad track 14 will cause wear on the vehicle tires 18. Furthermore, to prevent misuse and malfunction of the hi-rail wheel assembly 12, the hi-rail wheel assembly 12 must stay in the extended and locked position. As a result of the constant wear on, the vehicle tires 18, the vehicle tires 18 will not have sufficient traction with the railroad tracks to run efficiently, which will reduce the capacity of the vehicle 10 to provide a propelling force on the railroad tracks 14.

Figure 6A:
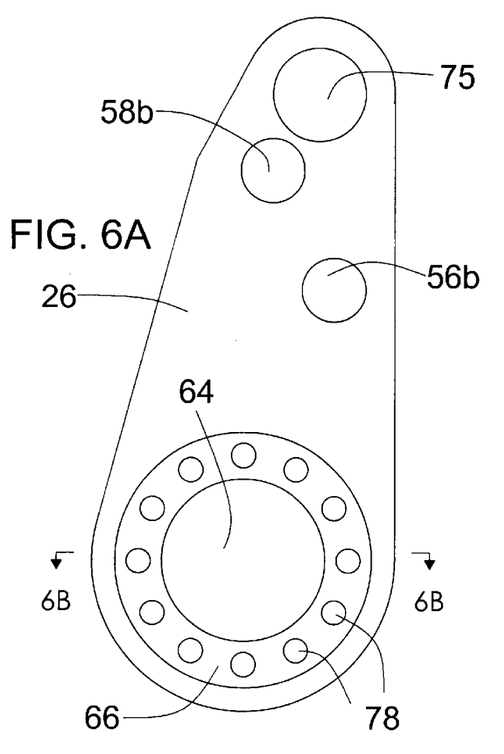
FIG. 6A is a side elevational view of a lower link plate of the hi-rail wheel assembly.
Figure 6B:
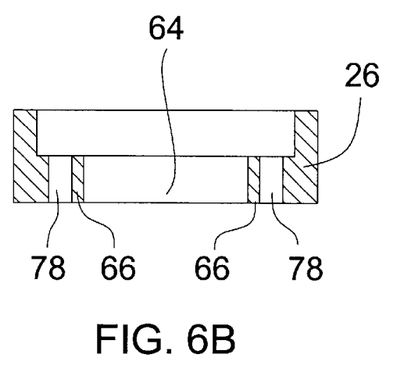
FIG. 6B is a sectional side elevational view of the lower link plate as illustrated in FIG. 6A taken along the lines 6B—6B.

To improve the traction of the vehicle tires 18 on the railroad tracks 14, each pivotal link 22, 23, 80, and 82 is designed to receive a cam 68 (see FIG. 4) which will allow vertical adjustment for the hi-rail wheel assembly 12 such that the vehicle wheels 18 may be lowered onto the railroad tracks 14 to improve the traction. As illustrated in FIGS. 6A and 6B, each lower link plate 26, 27, 88, and 90 is designed with a cam aperture 64 and a recessed cam shoulder 66 surrounding the cam aperture 64. The diameter of the outer periphery of the recessed cam shoulder 66 is such that it may receive the cam 68.

Figure 7A:
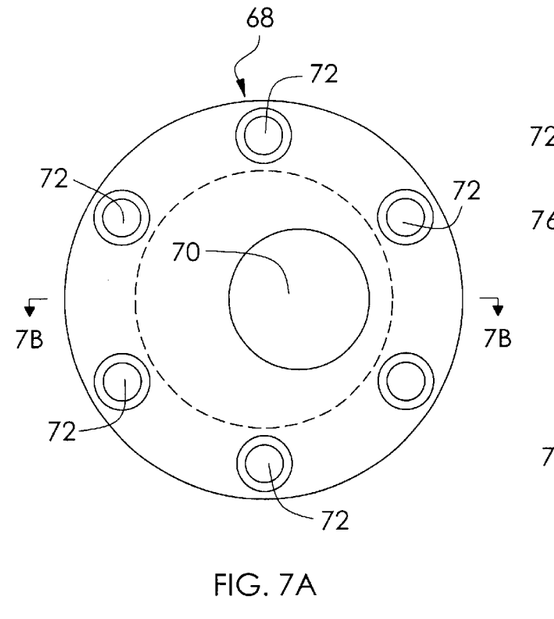
FIG. 7A is a side elevational view of a cam of the hi-rail wheel assembly.

Looking at FIG. 7A, the cam 68 of the present invention has an eccentric aperture 70 for receiving the block pins 28, 92 through the cam aperture 64 of the lower link plates 26, 27, 88, and 90 (illustrated in FIGS. 2 and 3). The eccentric aperture 70 is preferably positioned near the center of the cam 68. Furthermore, six cam mounting bores 72 are placed along the outer periphery of the cam 68. The cam mounting bores 72 are equally spaced along the outer periphery of the cam 68, and are used to secure the cam 68 to the lower link plate 26.

Figure 7B:
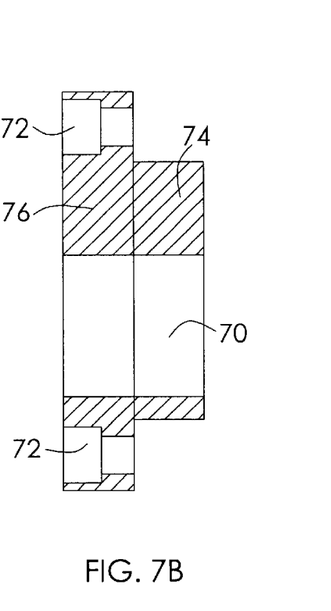
FIG. 7B is a sectional side elevational view of the cam as illustrated in FIG. 7A taken along the lines 7B—7B.

Looking at FIG. 7B, a sectional side view of the cam 68 illustrates the cam 68 being composed of a first disc 74 integrally connected to a second disc 76. The first disc 74 has a diameter substantially equal to the diameter of the cam aperture 64, and the second disc 76 has a diameter substantially equal to the diameter of the outer perimeter of the recessed cam shoulder 66. Consequently, when the cam 68 engages one of the lower link plates 26, 27, 88, or 90, the first disc 74 will engage the cam aperture 64 and the second disc 76 will cover the recessed cam shoulder 66. Moreover, the eccentric aperture 70 traverses both first and second discs 74, 76 of the cam 68 such that the eccentric aperture 70 will engage the block pin 28, 92 when the cam 68 engages the lower link plates 26, 27, 88, and 90 (see FIG. 4).

Referring to FIG. 6A, a closer view of an example of the lower link plates 26, 27, 88, and 90 of the current invention is illustrated having a plate connecting pivot aperture 75 and a cam aperture 64 for engaging the cam 68. As stated above, the recessed cam shoulder 66 surrounds the cam aperture 64, and the diameter of the recessed cam shoulder 66 is substantially equivalent to the diameter of the second disc 76 of the cam 68 such that the second disc 76 of the cam 68 may be inserted over the recessed cam shoulder 66. Preferably, the diameter of the cam 68 is approximately 4.24 inches, and thus the diameter of the circle defining the outer periphery of the recessed cam shoulder 66 is approximately 4.25 inches.

The recessed cam shoulder 66 further includes a plurality of connecting apertures 78. Looking at FIG. 4, the cam 68 is attached to the lower link plate 26 via a connecting means 81, such as a screw or a bolt, when the cam mounting bores 72 are aligned with the connecting apertures 78 such that the connecting means 81 may be inserted through both the cam mounting bore 72 of the cam 66 and the connecting apertures 78 of the lower link plate 26. Ideally, the diameter of each connecting aperture 78 and each cam mounting bore 72 is 0.375 inches. Since the second disc 76 engages the cam aperture 64, the eccentric aperture 70 of the cam 68 may be rotated within the open area defined by the circular cam aperture 64.

The distance between the railroad track 14 and the frame 20 is thereby determined by the mounted position of the eccentric aperture 70 within each lower link plate 26, 27, 88, and 90. As the cam 68 is rotated within each lower link plate 26, 27, 88, and 90, the position of the block pins 28, 92 with respect to the frame 20 will be adjusted according to the radial position of the eccentric aperture 70. Furthermore, to evenly position the hi-rail wheel assembly 12, the cams 68 in the first pair of pivotal links 22, 23 will be rotated in one direction, while the cams 68 in the second pair of pivotal links 80, 82 will be rotated in the opposite direction so that the position of the eccentric apertures 70 in the first pair of pivotal links 22, 23 will mirror that of the position of 20 the eccentric apertures 70 in the second pair of pivotal links 80, 82.

Preferably, there are six mounting bores 72 in the cam 68 and twelve connecting apertures 78 in the shoulder 66. Accordingly, the cam 68 can be rotated so that the mounting bores 72 will align with the desired connecting apertures 78 at several different points around the circumference of the recessed cam shoulder 66 to provide various distances between the frame 20 and the axle tube 32. Such an arrangement subsequently provides various degrees of connection between the vehicle wheels 18 and the railroad tracks 14.

In operation, when new vehicle tires 18 are used, the cam 68 will be mounted such that the eccentric aperture 70 is at the highest point of the rotation so as to provide the greatest distance between the axle tube 32 and the frame 20.

However, as wear begins to deteriorate the traction between vehicle tires 18 and the railroad tracks 14, the position of the cam 68 may be rotated such that the position of the eccentric aperture 70 moves the hi-rail assembly 12 such that the distance between the axle tube 32 and the frame 20 will be reduced. As a result, the vehicle wheels 18 will again make contact with the railroad tracks 14 to improve the traction and allow the vehicle wheels 18 to efficiently propel the hi-rail wheel assembly 12 on the railroad tracks 14.

Thus, although there have been described particular embodiments of the present invention of a new and useful HI-RAIL WHEEL ASSEMBLY FOR IMPROVED TRACTION, it is not intended that such references be construed as limitations upon the scope of this invention except as set forth in the following claims.

What is claimed is:

1. Hi-rail wheel assembly for a road vehicle, said assembly comprising:

a frame having first and second ends;

an axle;

holding means engaging said axle;

a pair of railway wheels mounted in spaced relation on said axle;

a first pair of spaced apart pivotal links having a cam aperture and a recessed cam shoulder surrounding said cam aperture, said first pair of pivotal links connected between said first end of said frame and said holding means;

a second pair of spaced apart pivotal links having a cam aperture and a recessed cam shoulder surrounding said cam aperture, said second pair of pivotal links connected between said second end of said frame and said holding means; and a plurality of cams, each cam having an eccentric aperture and operable to engage said cam aperture and said recessed cam shoulder of each of said pivotal links such that said holding means engages said eccentric aperture;

wherein extension of said pivotal links effects a downward lowering of said axle and retraction of said pivotal links effects an upward raising of said axle; and wherein the position of said eccentric aperture within said pivotal links determines the distance between said axle and said frame.

2. Hi-rail wheel assembly according to claim 1 wherein each pivotal link of said first pair of pivotal links and said second pair of pivotal links includes:

a upper link plate; and a lower link plate pivotally connected to said upper link plate.

3. Hi-rail wheel assembly according to claim 2 further comprising a locking means attached to each said pivotal link, said locking means arranged to secure each of said upper link plates to the associated lower link plates so as to hold said pivotal links in an extended or retracted position.

4. Hi-rail wheel assembly according to claim 3 wherein said locking means comprises:

a first locking aperture positioned in said upper link plate;

a second locking aperture positioned in said lower link plate; and a locking element to engage said first locking aperture and said second locking aperture to prevent relative motion therebetween.

5. Hi-rail wheel assembly according to claim 1 wherein said first and said second pivotal links swing in a plane which is in substantial alignment with said axle.

6. Hi-rail wheel assembly according to claim 1 wherein said cam includes:

a first disc to engage said cam aperture; and a second disc integrally attached to said first disc to engage said recessed cam shoulder, said second disc having a larger diameter than said second disc.

7. Hi-rail wheel assembly according to claim 6 further comprising:

a plurality of connecting means; and wherein said first disc further includes a plurality of mounting bores; and wherein said recessed cam shoulder includes a plurality of connecting apertures;

such that said connecting means engage said mounting bores and said connecting apertures to secure said second disc to said recessed cam shoulder.

8. A hi-rail wheel assembly having a frame connected to holding means surrounding an axle by a pair of pivotal links that vary the distance between the axle and the frame, said hi-rail wheel assembly comprising:

a cam having an eccentric aperture to engage the holding means; and wherein each pivotal link includes a cam aperture and a recessed cam shoulder surrounding said cam aperture;

wherein said cam is operable to engage said cam aperture and said recessed cam shoulder such that the position of said eccentric aperture in said cam aperture determines the distance between said axle and said frame.

9. The hi-rail wheel assembly as defined in claim 8 further comprising:

at least one mounting bore included in said cam;

at least one connecting aperture included in said recessed cam shoulder; and at least one connecting means operable to couple said mounting bore to said connecting aperture.

10. The hi-rail wheel assembly as defined in claim 8 wherein the cam further includes:

a first disc; and a second disc having a diameter greater than the diameter of said first disc;

wherein said first disc is integrally attached to said second disc such that said eccentric aperture traverses said first disc and said second disc.

11. A method of operating a roadway vehicle on a set of railroad tracks, the roadway vehicle having a front pair of tires and a rear pair of tires, the method comprising:

a) providing a hi-rail wheel assembly having a frame, an axle, a holding means connected to said axle, and two pairs of pivotal links connected between said holding means and said frame;

b) attaching said hi-rail wheel assembly to the vehicle;

c) providing a cam aperture and a recessed cam shoulder surrounding said cam aperture in each said pivotal link;

d) providing a cam having an eccentric aperture;

e) rotating said cam to engage said eccentric aperture to provide the desired distance between said frame and said axle;

f) inserting said cam into said cam aperture and onto said recessed cam shoulder;

g) engaging said eccentric aperture with said block pin such that the position of said eccentric aperture determines the distance between said axle and said frame; and h) lowering said hi-rail wheel assembly onto the railroad tracks such that one pair of vehicle tires engage said railroad tracks to propel said vehicle.

12. A hi-rail wheel assembly for a road vehicle, said assembly comprising:

a frame having a first and second end;

an axle;

at least one support block engaging said axle;

a pair of railway wheels mounted in spaced relation on said axle;

a first pair of spaced apart pivotal links having a cam aperture and a recessed cam shoulder surrounding said cam aperture, said first pair of pivotal links connected between said first end of said frame and said holding means;

a second pair of spaced apart pivotal links having a cam aperture and a recessed cam shoulder surrounding said cam aperture, said second pair of pivotal links connected between said second end of said frame and said holding means; and a plurality of cams, each cam having an eccentric aperture, and wherein each cam has a first diameter and a second diameter, said first diameter being operable to engage said cam aperture and said second diameter operable to engage said recessed cam shoulder of each of said pivotal links such that said support block engages said eccentric aperture;

wherein extension of said pivotal links effects a lowering of said axle and retraction of said pivotal links effects a raising of said axle; and wherein the position of said eccentric aperture within said pivotal links determines the distance between said axle and said frame.

13. The hi-rail wheel assembly according to claim 12 wherein each pivotal link of said first pair of pivotal links and said second pair of pivotal links includes:

a upper link plate; and a lower link plate pivotally connected to said upper link plate.

14. The hi-rail wheel assembly according to claim 12 wherein each said cam includes:

a first disc to engage said cam aperture, said first disc defining said first diameter; and a second disc integrally attached to said first disc to engage said recessed cam shoulder, said second disc defining said second diameter.

* * * * *